(12) United States Patent
Sekiguchi et al.

(10) Patent No.: US 11,024,879 B2
(45) Date of Patent: Jun. 1, 2021

(54) SECONDARY BATTERY, BATTERY PACK, AND VEHICLE

(71) Applicant: KABUSHIKI KAISHA TOSHIBA, Minato-ku (JP)

(72) Inventors: Yumiko Sekiguchi, Kawasaki (JP); Shinsuke Matsuno, Tokyo (JP); Hayato Seki, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 337 days.

(21) Appl. No.: 15/911,959

(22) Filed: Mar. 5, 2018

(65) Prior Publication Data

US 2019/0088999 A1    Mar. 21, 2019

(30) Foreign Application Priority Data

Sep. 20, 2017    (JP) ............................. JP2017-180276

(51) Int. Cl.
| | | |
|---|---|---|
| *H01M 10/0566* | (2010.01) | |
| *H01M 10/04* | (2006.01) | |
| *H01M 12/08* | (2006.01) | |
| *H01M 50/20* | (2021.01) | |

(52) U.S. Cl.
CPC ..... *H01M 10/0566* (2013.01); *H01M 10/045* (2013.01); *H01M 12/08* (2013.01); *H01M 50/20* (2021.01); *H01M 2300/0028* (2013.01)

(58) Field of Classification Search
CPC ........... H01M 10/0566; H01M 2/1083; H01M 10/045
See application file for complete search history.

(56) References Cited

U.S. PATENT DOCUMENTS

| | | | | |
|---|---|---|---|---|
| 6,143,443 | A * | 11/2000 | Kazacos | H01M 8/188 429/188 |
| 6,475,661 | B1 * | 11/2002 | Pellegri | H01M 8/188 429/105 |
| 2003/0090857 | A1 | 5/2003 | Liu et al. | |
| 2013/0045428 | A1 | 2/2013 | Visco et al. | |
| 2014/0178775 | A1 | 6/2014 | Lee et al. | |
| 2017/0271682 | A1 | 9/2017 | Matsuno et al. | |
| 2017/0271717 | A1 | 9/2017 | Yamashita et al. | |
| 2018/0272873 | A1 * | 9/2018 | Rohera | B60L 50/50 |

FOREIGN PATENT DOCUMENTS

| | | |
|---|---|---|
| CN | 101708867 A | 5/2010 |
| JP | 2003-234250 | 8/2003 |
| JP | 2012-33366 | 2/2012 |
| JP | 2013-12385 A | 1/2013 |

(Continued)

*Primary Examiner* — Helen Oi K Conley
(74) *Attorney, Agent, or Firm* — Oblon, McClelland, Maier & Neustadt, L.L.P.

(57) ABSTRACT

According to one embodiment, a secondary battery is provided. The secondary battery includes a positive electrode, a negative electrode, and an aqueous electrolyte containing alkali metal ions. The aqueous electrolyte contains an organic compound containing a carboxyl group or carboxylate group and a hydroxyl group. The pH of the aqueous electrolyte is 0 or less. The ratio of the weight of the organic compound to the weight of the aqueous electrolyte is within a range of 0.01% by weight to 6.5% by weight. The number of carbon atoms in the organic compound is 5 or more.

14 Claims, 7 Drawing Sheets

(56) References Cited

FOREIGN PATENT DOCUMENTS

| | | |
|---|---|---|
| JP | 5592836 | 9/2014 |
| JP | 2017-174809 A | 9/2017 |
| JP | 2017-174810 A | 9/2017 |
| WO | WO 2013/094689 A1 | 6/2013 |
| WO | WO 2016/114141 A1 | 7/2016 |
| WO | WO 2017/135323 A1 | 8/2017 |

* cited by examiner

SECONDARY BATTERY, BATTERY PACK, AND VEHICLE

CROSS-REFERENCE TO RELATED APPLICATIONS

This application is based upon and claims the benefit of priority from Japanese Patent Application No. 2017-180276, filed Sep. 20, 2017, the entire contents of which are incorporated herein by reference.

FIELD

Embodiments described herein relate generally to a secondary battery, a battery pack, and a vehicle.

BACKGROUND

A nonaqueous electrolyte battery formed by using a carbon material or a lithium titanium oxide as a negative electrode active material and a layered oxide that contains nickel, cobalt or manganese as a positive electrode active material, particularly a lithium secondary battery has already been in practical use as a power source in a wide range of fields. Such a nonaqueous electrolyte battery is provided in a variety of forms, such as small-sized batteries for various electronic devices and large-sized batteries for electric vehicles. As an electrolyte solution of the lithium secondary battery, a nonaqueous organic solvent prepared by mixing ethylene carbonate, methylethyl carbonate and the like is used, different from a nickel-hydrogen battery or a lead storage battery. An electrolyte solution prepared using the solvent has a high oxidation resistance and a high reduction resistant property compared to those of an aqueous electrolyte solution, whereby electrolysis of the solvent hardly occurs. Thus, in the case of a nonaqueous lithium secondary battery, a high electromotive force of from 2 V to 4.5 V is attained.

Meanwhile, many organic solvents are flammable substances. Accordingly, the safety of a secondary battery formed by using an organic solvent is theoretically inferior to that of a secondary battery formed by using an aqueous solution. In order to improve the safety of a lithium secondary battery formed by using an electrolyte solution containing an organic solvent, various countermeasures have been made, however it is not exactly sufficient. In the production process of the nonaqueous lithium secondary battery, a dry environment is necessary, thereby inevitably increasing the production cost. In addition, the electrolyte solution containing an organic solvent is inferior in electrical conductivity, whereby an internal resistance of the nonaqueous lithium secondary battery is easily increased. Such problems cause large defects of electric vehicles or hybrid electric vehicles and large-sized storage batteries for stationary energy storage, where emphasis is on the battery safety and cost.

In order to solve these problems, a process of converting an electrolyte solution to an aqueous solution has been examined. In the case of the aqueous electrolyte solution, it is necessary that the potential range to perform charge/discharge of a battery is set to the potential range which does not causes an electrolysis reaction of water contained as a solvent. The electrolysis of water can be avoided by using, for example, a lithium manganese oxide as the positive electrode active material and a lithium vanadium oxide as the negative electrode active material. Although the combination of these materials results in an electromotive force of from 1 to 1.5 V, an energy density sufficient as a battery is hardly obtained.

A lithium manganese oxide is used as the positive electrode active material and a lithium titanium oxide such as $LiTi_2O_4$ or $Li_4Ti_5O_{12}$ is used as the negative electrode active material so that an electromotive force of from 2.6 to 2.7 V can be theoretically obtained. From the viewpoint of energy density, an attractive battery can be produced. A nonaqueous lithium secondary battery formed by using a combination of the positive and negative electrode materials exhibits an excellent life performance. Such a battery has already been in practical use. However, in the aqueous electrolyte solution, the lithium titanium oxide has a lithium insertion/extraction potential of about 1.5 V (vs. Li/Li$^+$) based on lithium potential, whereby electrolysis is easily caused. Particularly, in a negative electrode, hydrogen is intensely generated by electrolysis on the surface of a metal outer can electrically connected to a negative electrode current collector or the negative electrode. The influence causes the active material to be easily peeled from the current collector. Consequently, such a battery does not operate stably, whereby it is not possible to perform a satisfactory charge-discharge cycle.

DETAILED DESCRIPTION

Figure 1:
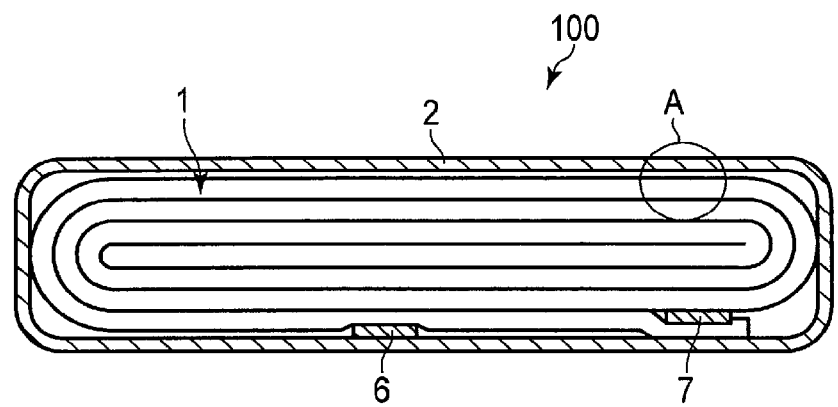
FIG. 1 is a cross-sectional view schematically showing an example of a secondary battery according to a first embodiment.

According to a first embodiment, a secondary battery is provided. The secondary battery includes a positive electrode, a negative electrode, and an aqueous electrolyte containing alkali metal ions. The aqueous electrolyte contains an organic compound containing a carboxyl group or carboxylate group and a hydroxyl group. The pH of the aqueous electrolyte is 0 or less. The ratio of the weight of the organic compound to the weight of the aqueous electrolyte is within a range of 0.01% by weight to 6.5% by weight. The number of carbon atoms in the organic compound is 5 or more.

According to a second embodiment, a battery pack is provided. The battery pack includes the secondary battery according to the first embodiment.

According to a third embodiment, a vehicle is provided. The vehicle includes the battery pack according to the second embodiment.

Embodiments are explained below, referring to drawings. The same number is applied to common structures throughout the following embodiments, and overlapped explanations are omitted. In addition, each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

According to a first embodiment, a secondary battery is provided. The secondary battery includes a positive electrode, a negative electrode, and an aqueous electrolyte containing alkali metal ions. The aqueous electrolyte contains an organic compound containing a carboxyl group or carboxylate group and a hydroxyl group. The pH of the aqueous electrolyte is 0 or less. The ratio of the weight of the organic compound to the weight of the aqueous electrolyte is within a range of 0.01% by weight to 6.5% by weight. The number of carbon atoms in the organic compound is 5 or more.

An aqueous electrolyte contained in a secondary battery according to an embodiment contains an organic compound (also called a first compound) containing the carboxyl group or carboxylate group and the hydroxyl group in such a content that pH of the aqueous electrolyte is 0 or less.

The degree of ionization of the COOH group (carboxyl group) is relatively low and thus, when a compound containing the COOH group is dissolved in water, the obtained solution normally indicates a weak acidity. However, an aqueous electrolyte according to the embodiment contains alkali metal ions. In this case, ionization of the COOH group contained in the first compound is promoted, and the concentration of protons ($H^+$) in the aqueous electrolyte increase. Then, a part of the dissociated $COO^-$ groups (carboxylate groups) is coordinated with alkali metal ions to form a complex. The ionization of the COOH group contained in the first compound and the reaction of complex formation of the ionized $COO^-$ group and alkali metal ions are an equilibrium reaction.

The $COO^-$ group forms complexes with various metals and thus, another part of the dissociated $COO^-$ groups forms a solid electrolyte interface (SEI) on a negative electrode surface described below. The negative electrode surface means, for example, the surface of negative electrode active material particles and/or the surface of a negative electrode current collector.

As described above, since the ionization of the COOH group in the first compound is promoted, pH of the aqueous electrolyte becomes 0 or less and also the concentration of the $COO^-$ group in the aqueous electrolyte increases. As a result, a sufficient number of $COO^-$ groups form complexes with metal on the negative electrode surface. Complexes of the $COO^-$ groups and metal generate SEI on the negative electrode surface. Accordingly, the charge-and-discharge property and cycle life performance are improved. If pH of the aqueous electrolyte exceeds 0, the COOH group is not sufficiently ionized and the number of $COO^-$ groups to form SEI may run short.

Also, since the first compound contains the hydroxyl group, water molecules are hydrogen-bonded to the hydroxyl group to suppress water decomposition during charging and discharging. As a result, hydrogen is less likely to be generated from the negative electrode, and the charge-and-discharge property and cycle life performance are improved.

A secondary battery according to the embodiment may further include a separator arranged between a positive electrode and a negative electrode. The positive electrode, the negative electrode, and the separator can constitute an electrode group. The aqueous electrolyte may be held by the electrode group. The secondary battery may further include a container member capable of housing the electrode group and the aqueous electrolyte.

Also, the secondary battery may further include a negative electrode terminal electrically connected to the negative electrode and a positive electrode terminal electrically connected to the positive electrode.

Hereinafter, the aqueous electrolyte, the positive electrode, the negative electrode, the separator, the container member, the negative electrode terminal, and the positive electrode terminal will be described in detail.

(1) Aqueous Electrolyte

The aqueous electrolyte contains a solvent containing water, alkali metal ions, and an organic compound containing a carboxyl group or carboxylate group and a hydroxyl group. The organic compound may contain both the carboxyl group and carboxylate group.

The water-containing solvent may be pure water, or may be a mixed solution and/or a mixed solvent of water and a material other than water.

Alkali metal ions are, for example, cations derived from an electrolyte salt. Examples of the alkali metal ions include lithium ions and sodium ions. The aqueous electrolyte may contain both lithium ions and sodium ions. Alkali metal ions are preferably lithium ions.

Examples of the electrolyte salt include a lithium salt and a sodium salt.

Examples of the lithium salt include LiCl, LiBr, LiOH, $Li_2SO_4$, $LiNO_3$, $LiN(SO_2CF_3)_2$ (LiTFSI: lithium bis(trifluoromethanesulfonyl)imide), $LiN(SO_2F)_2$ (LiFSI: lithium bis(fluorosulfonyl)imide), and $LiB[(OCO)_2]_2$ (LiBOB: lithium bis(oxalate)borate). The kind of the lithium salt used may be one kind or may be two or more kinds.

Examples of the sodium salt include NaCl, $Na_2SO_4$, NaOH, $NaNO_3$, NaTFSA (sodium trifluoromethanesulfonylamide), and the like. The kind of the sodium salt used may be one kind or may be two or more kinds.

The aqueous electrolyte may contain an electrolyte salt not containing lithium or sodium. As such an electrolyte salt, for example, $ZnSO_4$ can be cited.

The aqueous electrolyte may be a liquid (aqueous electrolytic solution) or a gel-like aqueous electrolyte in which an aqueous electrolytic solution and a polymer material are combined. Examples of the polymer material include polyvinylidene fluoride (PVdF), polyacrylonitrile (PAN), polyethylene oxide (PEO), and the like.

The aqueous electrolyte preferably contains 1 mol or more of water solvent (for example, the amount of water in the water-containing solvent) with respect to 1 mol of electrolyte salt that is a solute. The amount of the water solvent with respect to 1 mol of electrolyte salt is preferably 3.5 mol or more.

The aqueous electrolyte is prepared, for example, by dissolving an electrolyte salt in a water-containing solvent at a concentration of 6 to 12 mol/L. The molar concentration of the electrolyte salt in the aqueous electrolyte is preferably 9 M or more. In this case, an insertion/extraction reaction of alkali metal ions as carrier ions into/from the active material becomes dominant over the electrolysis of water.

If the molar concentration of the electrolyte salt in the aqueous electrolyte is excessively low, charge carriers may run short or the battery may not operate as a secondary battery because the water decomposition becomes dominant over insertion of alkali metal ions into the negative electrode.

That the aqueous electrolyte contains water can be confirmed by GC-MS (Gas Chromatography-Mass Spectrometry). In addition, the salt concentration and the water content in the aqueous electrolyte can be measured by, for example, ICP (Inductively Coupled Plasma) emission spectrometry. The molar concentration (mol/L) can be calculated by measuring a predetermined amount of aqueous electrolyte and calculating the concentration of contained salt. In addition, the number of moles of the solute and the solvent can be calculated by measuring the specific gravity of the aqueous electrolyte.

pH of the aqueous electrolyte is measured by a pH meter. Measurement of pH is made as described below.

<pH Measuring Method of the Aqueous Electrolyte>

For example, LAQUA twin manufactured by HORIBA is used for the measurement. First, standard solutions of pH 4.0, 7.0, and 9.0 are prepared. Next, these standard solutions are used to calibrate a pH meter. pH is measured by dripping an appropriate amount of the aqueous electrolyte to be measured on a sensor unit. After pH measurement, the sensor unit of the pH meter is cleaned. The above procedure, that is, the calibration, measurement, and cleaning are repeated each time another aqueous electrolyte to be measured is measured.

The ratio of the weight of the first compound to the weight of the aqueous electrolyte is within a range of 0.01% by weight to 6.5% by weight and preferably within a range of 1% by weight to 3% by weight. If this ratio is excessively low, the formation amount of the above SEI may run short or the effect of suppressing the generation of hydrogen may be insufficient. If this ratio is excessively high, the viscosity increases excessively and ionic conductivity decreases. Therefore, the charge-and-discharge property and cycle life performance tend to deteriorate.

The ratio of the weight of the first compound to the weight of the aqueous electrolyte is determined by, for example, high performance liquid chromatography (HPLC). A chromatograph is acquired by making HPLC measurement of the electrolytic solution. Next, a calibration curve is created using a standard product of the first compound and the standard product is used to calculate a concentration of the first compound in the electrolytic solution. Conditions for the HPLC analysis are as shown in Table 1 below:

TABLE 1

| Column | RSpak KC-811 (6 μm, 8.0 mm i.d. × 300 mm, Manufactured by Shodex) |
|---|---|
| Mobile phase | Phosphoric acid (10 mmol/L) |
| Flow rate (mL/min) | 0.5 |

TABLE 1-continued

| Detected wavelength (nm) | 220 |
|---|---|
| Column temperature (° C.) | 40 |
| Injection amount (μL) | 20 |

A ratio NH/NC of a number NH of the hydroxyl groups contained in the first compound to a number NC of the carboxyl groups or carboxylate groups contained in the first compound is within a range of, for example, 0.1 to 10. The ratio NH/NC is preferably within a range of 0.3 to 5.

The first compound may contain one hydroxyl group or two or more hydroxyl groups in one molecule. The first compound may contain one carboxyl group or two or more carboxyl groups in one molecule. The first compound may contain one carboxylate group or two or more carboxylate groups in one molecule.

Incidentally, the number NC of the carboxyl groups or carboxylate groups contained in the first compound means the number NC of the carboxyl groups or carboxylate groups in one molecule of the first compound. The number NH of the hydroxyl groups contained in the first compound means the number NH of the hydroxyl groups in one molecule of the first compound. When both of the carboxyl group and carboxylate group are contained in one molecule of the first compound, the number NC means the total of the carboxyl groups and carboxylate groups in one molecule of the first compound.

When the ratio NH/NC is within a range of 0.3 to 5, compared with a case in which the ratio NH/NC is not within the range, capturing of water by the carboxyl group or carboxylate group and the hydroxyl group and coating of the active material or the electrode with metal occur efficiently. Therefore, the generation of hydrogen from the negative electrode can be suppressed more.

The number NC of the carboxyl groups or carboxylate groups and the number NH of the hydroxyl groups contained in the first compound can be determined by nuclear magnetic resonance spectroscopy (NMR). The first compound can be identified by performing proton NMR. That is, the NC of the carboxyl groups or carboxylate groups and the number NH of the hydroxyl groups contained in the first compound are revealed.

The proton NMR can be performed according to the following procedure.

A sample is put into an NMR sample tube and the tube is inserted into a nuclear magnetic resonance apparatus to measure an $^1$H NMR spectrum. The sample may be concentrated so as to be able to obtain spectra appropriate for analysis. For example, conditions shown in Table 2 may be used as conditions for measurement. As an index of chemical shift, for example, 1% by weight of a heavy water solution of deuterated 4,4-dimethyl-4-silapentane-1-sulfonic acid (DSS-$d_6$) can be used as an internal index or an external index. The first compound can be identified by checking the obtained $^1$H NMR spectrum against spectra of known compounds. As a result, the number NC of the carboxyl groups or carboxylate groups, and the number NH of the hydroxyl groups contained in the first compound can be determined.

TABLE 2

| | $^1$H |
|---|---|
| Observed frequency (MH: | 400 |
| Reference material | DSS-d$_6$ 1 wt % heavy water solution |
| Measured temperature | Room temperature (15° C.~25° C.) |
| Pulse sequence | Single pulse |
| Deuterium lock | None |
| Field gradient shimming | Available |
| Flip angle (°) | 45 |
| Pulse delay time (s) | 5 |

The ionic conductivity of the aqueous electrolyte is preferably within a range of 13.0 S/m to 14.3 S/m. If the ionic conductivity is within this range, diffusion of carrier ions in the electrolytic solution occurs efficiently, which is preferable.

The first compound is preferably hydroxy acid.

Also, the first compound is preferably a compound that is easily soluble in water.

The number of carbon atoms in the first compound is 5 or more. If the number of carbon atoms in the first compound is 4 or less, a coordination force on metal of the first compound is too strong and current collecting foil may be corroded, which is not preferable.

If the number of carbon atoms in the first compound is too many, solubility in water decreases and therefore, the number of carbon atoms in the first compound is, for example, 10 or less and preferably 7 or less.

Examples of the first compound include malic acid, sodium hydrogen malate, tartaric acid, sodium hydrogen tartrate, potassium hydrogen tartrate, citric acid, sodium dihydrogen citrate, potassium dihydrogen citrate, 2-hydroxysuccinmethyl ester, 3-hydroxy-3-methylglutaric acid, diammonium citrate, 1,2-hydroxypropane-1,2,3-tricarboxylic acid tripotassium salt, potassium hydroxycitrate, gluconic acid (glucono-δ-lactone), D-glucuronic acid, sodium gluconate, potassium gluconate, mucic acid, D-glucaro-1,4-lactone, D-galacturonic acid, D-galacturonic acid sodium salt, L-idaric acid-1,4-lactone, potassium bisaccharate, 1-O-methyl-β-D-glucuronic acid sodium salt, and ethyl β-D-glucuronide. The kind of the first compound used may be one kind of compound or may be two or more kinds of compounds.

The first compound is preferably at least one compound selected from a group including glucono-δ-lactone and citric acid. If these compounds are used as the first compound, capturing of water by the hydroxyl group and the carboxyl group and coating of the active material or electrodes with metal are considered to occur efficiently.

Here, the mechanism used by lactone to indicate acidity in an aqueous solution will be described. Here, as an example, the mechanism used by glucono-δ-lactone to indicate acidity will be described.

First, water is in a state of a dissociation equilibrium shown in Formula 1 below in an aqueous solution:

[Chem1]

$$H_2O \rightleftharpoons H^+ + HO^-$$ (1)

Hydroxide ions (HO$^-$) generated by dissociation of water make a nucleophilic attack on a carbon atom next to an oxygen atom of a lactone ring, then the lactone ring opens to generate carboxylate. This equilibrium reaction is shown in Formula 2 below:

[Chem 2]

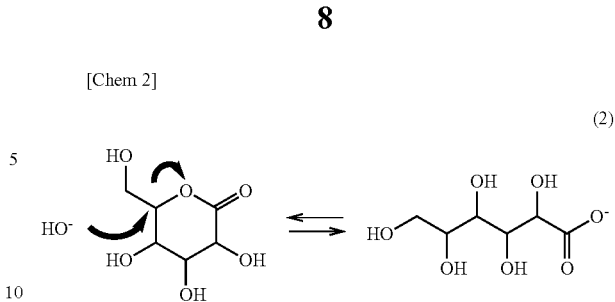

(2)

An aqueous electrolyte according to the embodiment contains alkali metal ions and carboxylate strongly interacts with the alkali metal ions. Thus, the equilibrium reaction in Formula 2 proceeds in a direction in which carboxylate is generated, that is, the direction in which the lactone ring opens. Due to consumption of hydroxide ions to open the lactone ring, the dissociation equilibrium of water indicated in Formula 1 proceeds in a direction in which hydroxide ions are generated, that is, the direction in which water is dissociated. Therefore, the proton concentration in the aqueous electrolyte increases and the aqueous electrolyte indicates acidity.

In the present embodiment, the aqueous electrolyte contains the first compound in which the number of carbon atoms is 5 or more, pH thereof is 0 or less, and the ratio of the weight of the first compound to the weight of the aqueous electrolyte is within a range of 0.01% by weight to 6.5% by weight. As a result, as described above, the charge-and-discharge property and cycle life performance are improved.

However, coulombic efficiency and cycle life performance of a secondary battery may be improved even if both of a second compound and a third compound described below are contained in the aqueous electrolyte, instead of the first electrolyte. The aqueous electrolyte may contain both of the second compound and the first compound. The aqueous electrolyte may contain both of the third compound and the first compound.

The second compound is a compound that contains the carboxyl group or carboxylate group in its structure, but does not contain the hydroxyl group.

As the second compound, for example, valeric acid, butyric acid, propionic acid, acetic acid, adipic acid, glutaric acid, succinic acid, and malonic acid can be cited.

The third compound is a compound that contains the hydroxyl group in its structure, but does not contain the carboxyl group and carboxylate group.

As the third compound, for example, allose, talose, gulose, glucose (grape sugar), altrose, mannose, galactose, idose ribose, lyxose, xylose, arabinose, apiose, erythrose, threose, glyceraldehyde, sedoheptulose, coriose, psicose, fructose, sorbose, tagatose, ribulose, xylulose, erythrulose, dihydroxyacetone, trehalose, isotrehalose, kojibiose, sophorose, nigerose, laminaribiose, maltose, cellobiose, isomaltose, gentiobiose fructooligosaccharide, galactooligosaccharide, chichihate oligosaccharide, deoxyribose, fucose, rhamnose, glucosamine, galactosamine, glycerin, xylitol, sorbitol, ascorbic acid, glucuronolactone, gluconolactone, starch, amylose, amylopectin, glycogen, cellulose, pectin, and glucomannan can be cited.

If an aqueous electrolyte contains the second compound or the third compound, the carboxyl group or carboxylate group and the hydroxyl group contained in the respective compound exhibits an acting similar to the acting described above about the first compound. As a result, also in this case, the charge-and-discharge property and cycle life performance may be improved. This effect can be obtained also when the aqueous electrolyte contains both of the second compound and the first compound. Also, this effect can be obtained when the aqueous electrolyte contains both of the third compound and the first compound.

(2) Negative Electrode

The negative electrode includes a negative electrode current collector and a negative electrode active material-containing layer which is supported on one side or both sides of the negative electrode current collector and includes an active material, a conductive agent, and a binder.

The negative electrode current collector is preferably aluminum foil or aluminum alloy foil containing at least one element selected from Mg, Ti, Zn, Mn, Fe, Cu, and Si. The aluminum alloy foil may contain only one of these elements or two or more elements. The negative electrode current collector may be in other forms such as a porous body or a mesh.

The negative electrode active material-containing layer is arranged on at least one surface of the negative electrode current collector. For example, the negative electrode active material-containing layer may be arranged on one surface of the negative electrode current collector or the negative electrode active material-containing layer may be arranged on one side and the reverse side of the negative electrode current collector.

As the negative electrode active material, titanium-containing oxides such as titanium oxide, lithium-titanium oxide, niobium titanium oxide and orthorhombic titanium composite oxide may be used. The Li insertion potential of the titanium-containing oxide is in the range of, for example, 1 V (vs. Li/Li$^+$) to 3 V (vs. Li/Li$^+$). The Li insertion potential of the titanium-containing oxide is preferably in the range of 1.2 V (vs. Li/Li$^+$) to 2.0 V (vs. Li/Li$^+$). The negative electrode active material can include one or more of these titanium-containing oxides.

Examples of the titanium oxide include a titanium oxide having a monoclinic structure, a titanium oxide having a rutile structure, and a titanium oxide having an anatase structure. As for the titanium oxide having each of the crystal structures, the composition before charge is $TiO_2$ and the composition after charge is $Li_xTiO_2$ (x is 0≤x≤1). Further, the structure of the titanium oxide having a monoclinic structure before charge is $TiO_2$ (B).

Examples of the lithium titanium oxide include a lithium titanium oxide having a spinel structure (e.g., $Li_{4+x}Ti_5O_{12}$ (−1≤x≤3); and a lithium titanium oxide having a ramsdellite structure (e.g., $Li_{2+x}Ti_3O_7$ (−1≤x≤3), $Li_{1+x}Ti_2O_4$ (0≤x≤1), $Li_{1.1+x}Ti_{1.8}O_4$ (0≤x≤1), $Li_{1.07+x}Ti_{1.86}O_4$ (0≤x≤1), and $Li_x$-$TiO_2$ (0≤x≤1). The lithium titanium oxide may be a lithium-titanium composite oxide into which a dopant is introduced. As an example of the titanium composite oxide, hollandite titanium composite oxide can be cited.

Examples of the niobium titanium oxide include a niobium titanium oxide represented by $Li_aTiM_bNb_{2±β}O_{7±σ}$ (0≤a≤5, 0≤b≤0.3, 0≤β≤0.3, 0≤σ≤0.3, where M is at least one kind of elements selected from the group consisting of Fe, V, Mo, and Ta).

Orthorhombic titanium-containing composite oxide contains, for example, a compound represented by $Li_{2+a}M(I)_{2-b}Ti_{6-c}M(II)_dO_{14+σ}$. Here, m(I) is at least one of elements selected from a group consisting of Sr, Ba, Ca, Mg, Na, Cs, Rb, and K. M(II) is at least one of elements selected from a group consisting of Zr, Sn, V, Nb, Ta, Mo, W, Y, Fe, Co, Cr, Mn, Ni, and Al. Each subscript in the compositional formula satisfies: 0≤a≤6, 0≤b<2, 0≤c<6, 0≤d<6, and −0.5≤σ≤0.5. As a concrete example of the orthorhombic titanium-containing composite oxide, $Li_{2+a}Na_2Ti_6O_{14}$ (0≤a≤6) can be cited.

In a secondary battery according to the embodiment, since the aqueous electrolyte contains the first compound and pH is equal to 0 or less, the COO$^-$ group contained in the first compound forms SEI on the negative electrode surface. Therefore, the generation of hydrogen can be suppressed even if titanium-containing oxide whose operating potential is low as described above is used as the negative electrode active material.

The negative electrode contains a negative electrode active material, for example, in the form of particles. Negative electrode active material particles may be single primary particles, secondary particles which are aggregates of the primary particles, or a mixture of single primary particles and secondary particles. The shape of the particles is not particularly limited, and may be, for example, a spherical shape, an elliptical shape, a flat shape or a fibrous shape.

A conductive agent is added in order to increase the current-collecting performance and suppress the contact resistance between the active material and the current collector. Examples of the conductive agent include carbonaceous materials such as carbon black such as vapor grown carbon fiber (VGCF) and acetylene black, and graphite. One of these materials may be used as the conductive agent, or two or more of these materials may be combined and used as the conductive agent. Alternatively, instead of using the conductive agent, carbon coating or electron conductive inorganic material coating may be performed on the surfaces of the active material particles.

A binder is added in order to fill a gap between dispersed active materials and bind the active material and the negative electrode current collector. Examples of the binder include polytetrafluoroethylene (PTFE), polyvinylidene fluoride (PVdF), fluorine rubber, styrene butadiene rubber, polyacrylic acid compound, imide compound, carboxymethyl cellulose (CMC), and salts of the CMC. One of these materials may be used as the binder, or two or more of these materials may be combined and used as the binder.

In the compounding ratios of the negative electrode active material, the conductive agent, and binder in the negative electrode active material-containing layer, it is preferable that the negative electrode active material is in the range of 70% by mass to 95% by mass, the conductive agent is in the range of 3% by mass to 20% by mass, and the binder is in the range of 2% by mass to 10% by mass. When the compounding ratio of the conductive agent is 3% by mass or more, current-collecting performance of the negative electrode active material-containing layer can be improved. When the content of the binder is 2% by mass or more, sufficient electrode strength can be obtained, and when the content of the binder is 10% by mass or less, the insulating part of the electrode can be reduced.

A material that is electrochemically stable at a potential at which alkali metal ions are inserted into and extracted from the negative electrode active material is used for the negative electrode current collector. The negative electrode current collector is preferably made of zinc, copper, nickel, stainless steel, or aluminum, or made of an aluminum alloy containing one or more elements selected from Mg, Ti, Zn, Mn, Fe, Cu, and Si.

When a current collector made of practically Zn is used as the negative electrode current collector, electrodeposition of Zn is promoted, which is preferable. pH of an aqueous electrolyte according to the present embodiment is 0 or less. In an aqueous electrolyte in which pH is 0 or less, as described above, many of COOH groups are assumed to be dissociated and present as COO⁻ groups. When the current collector made of Zn comes into contact with the aqueous electrolyte in this state, elution of $Zn^{2+}$ from the current collector made of Zn is promoted. The eluted $Zn^{2+}$ is reduced on the negative electrode surface before being deposited as a metal Zn. The metal Zn is considered to be oxidized in the end and deposited on the negative electrode surface as ZnO. As a result, a hydrogen overvoltage rises so that water decomposition is suppressed. Therefore, when a current collector made of practically Zn is used as the negative electrode current collector, the charge-and-discharge property and cycle life performance are further improved.

The thickness of the negative electrode current collector is preferably in the range of 5 μm to 20 μm. A negative electrode current collector having such a thickness can keep the strength of negative electrode and the reduction of weight in balance.

Also, the negative electrode current collector may include a part on the surface where no negative electrode active material-containing layer is formed. The part can act as a negative electrode tab.

The density of the negative electrode active material-containing layer (excluding the current collector) is preferably in the range of 1.8 g/cm³ to 2.8 g/cm³. A negative electrode in which the density of the negative electrode active material-containing layer is within this range is excellent in energy density and the retention of aqueous electrolyte. The density of the negative electrode active material-containing layer is more desirably in the range of 2.1 g/cm³ to 2.6 g/cm³.

The negative electrode can be produced by, for example, the following method. First, a negative electrode active material, a conductive agent, and a binder are suspended in a solvent to prepare a slurry. The slurry is applied to one side or both sides of a negative electrode current collector. Next, the applied slurry is dried to obtain a laminated body of the negative electrode active material-containing layer and the negative electrode current collector. Then, the laminated body is pressed. In this manner, a negative electrode is produced.

Alternatively, a negative electrode is produced by the following method: First, a negative electrode active material, a conductive agent, and a binder are mixed to obtain a mixture thereof. Next, the mixture is molded into a pellet form. Next, a negative electrode can be obtained by arranging these pellets on the negative electrode current collector.

(3) Positive Electrode

The positive electrode may include a positive electrode current collector and a positive electrode active material-containing layer. The positive electrode active material-containing layer may be formed on one side or both sides of the positive electrode current collector. The positive electrode active material-containing layer may include a positive electrode active material, and optionally a conductive agent and a binder.

As the positive electrode active material, for example, an oxide or sulfide can be used. The positive electrode may contain one kind of compound alone as the positive electrode active material or two kinds or more of compounds in combination. As an example of the oxide or sulfide, a compound capable of having an alkali metal or alkali metal ions be inserted and extracted.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x\leq1$), iron sulfates [$Fe_2(SO_4)_3$], vanadium oxides (e.g., $V_2O_5$), and lithium nickel cobalt manganese composite oxide ($Li_xNi_{1-x-y}Co_xMn_yO_2$; $0<x\leq1$, $0<y<1$, $0<z<1$, $y+z<1$).

Among the above compounds, examples of more desirable compounds as the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-x-y}Co_xMn_yO_2$; $0<x\leq1$, $0<y<1$, $0<z<1$, $y+z<1$). When these compounds are used as the positive electrode active material, the positive electrode potential can be increased.

When a room temperature molten salt is used as the electrolyte of the battery, it is preferable to use a positive electrode active material including lithium iron phosphate, $Li_xVPO_4F$ ($0\leq x\leq1$), lithium manganese composite oxide, lithium nickel composite oxide, lithium nickel cobalt composite oxide, or a mixture thereof. Since these compounds have low reactivity with room temperature molten salts, cycle life can be improved. Details regarding the room temperature molten salt are described later.

The primary particle size of the positive electrode active material is preferably from 100 nm to 1 μm. The positive electrode active material having a primary particle size of 100 nm or more is easy to handle during industrial production. In the positive electrode active material having a primary particle size of 1 μm or less, diffusion of lithium ions within solid can proceed smoothly.

The specific surface area of the positive electrode active material is preferably in the range of 0.1 m²/g to 10 m²/g. A positive electrode active material having the specific surface area of 0.1 m²/g or more can adequately secure insertion/extraction sites of lithium ions. A positive electrode active material having the specific surface area of 10 m²/g or less is easy to handle in industrial production and also can ensure charge-and-discharge cycle performance.

The binder is added to fill gaps among the dispersed positive electrode active material and also to bind the positive electrode active material with the positive electrode current collector. Examples of the binder include polytetrafluoro ethylene (PTFE), polyvinylidene fluoride (PVdF), flurorubber, polyacrylic compound, imide compound, carboxyl methyl cellulose (CMC), and CMC salt. One of these may be used as the binder or a combination of two or more may be used as the binder.

The conductive agent is added to improve a current collection performance and to suppress the contact resistance between the positive electrode active material and the positive electrode current collector. Examples of the conductive agent include carbonaceous substances such as vapor grown carbon fiber (VGCF), carbon black such as acetylene black, and graphite. One of these may be used as the conductive agent, or two or more, may be used in combination as the conductive agent. The conductive agent may be omitted.

In the positive electrode active material-containing layer, the positive electrode active material and binder are preferably blended in proportions of 80% by mass to 98% by mass, and 2% by mass to 20% by mass, respectively.

By setting the amount of the binder to 2% by mass or more, sufficient electrode strength can be obtained. The binder may also function as an insulator. Thus, if the amount of the binder to 20% by mass or less, the amount of insulator contained in the electrode decreases, and thereby internal resistance can be decreased.

When a conductive agent is added, the positive electrode active material, and the binder, the conductive agent are preferably blended in proportions of 77% by mass to 95% by mass, 2% by mass to 20% by mass, and 3% by mass to 15% by mass, respectively.

By setting the amount of the conductive agent to 3% by mass or more, the above effect can be expressed. Also, by setting the amount of the conductive agent to 15% by mass or less, the ratio of the conductive agent in contact with the electrolyte can be reduced. When this ratio is low, decomposition of the electrolyte can be reduced during storage under high temperatures.

The positive electrode current collector is preferably titanium, aluminum, or an aluminum alloy containing one or more elements selected from Mg, Ti, Zn, Ni, Cr, Mn, Fe, Cu, and Si.

The thickness of the positive electrode current collector is preferably in the range of 5 μm to 20 μm and more preferably 15 μm or less.

Also, the positive electrode current collector may include a part on the surface where no positive electrode active material-containing layer is formed. The part can act as a positive electrode tab.

The positive electrode is produced by, for example, the following method. First, a positive electrode active material, a conductive agent, and a binder are suspended in a solvent to prepare a slurry. The slurry is applied to one side or both sides of a positive electrode current collector. Next, the applied slurry is dried to obtain a laminated body of the positive electrode active material-containing layer and the positive electrode current collector. Then, the laminated body is pressed. In this manner, a positive electrode is produced.

(4) Separator

A separator can be arranged between the positive electrode and the negative electrode. The separator is formed from, for example, a porous film containing polyethylene (PE), polypropylene (PP), cellulose, or polyvinylidene fluoride (PVdF) or a synthetic resin nonwoven fabric.

The separator may be an ion exchange membrane or a solid electrolyte.

The ion exchange membrane is, for example, a cation exchange membrane of a monovalent selective system. If such an ion exchange membrane is used, only alkali metal ions can selectively permeate the ion exchange membrane. Other ions contained in the aqueous electrolyte, for example, anions do not permeate the ion exchange membrane. Examples of the alkali metal ions include lithium ions and sodium ions.

The solid electrolyte includes, for example, a compound in which alkali metal ion conductivity is $10^{-10}$ S/cm or more. The compound in which alkali metal ion conductivity is $10^{-10}$ S/cm or more is at least one compound selected from a group consisting of, for example, $Li_2SeP_2S_5$ based glass ceramic of sulfides, an inorganic compound having a perovskite structure, an inorganic compound having an LiSICON structure, an inorganic compound having a NASICON skeleton (for example, LATP described below), amorphous LIPON, and an inorganic compound having a garnet structure.

The solid electrolyte is preferably oxides such as LATP ($Li_{1+x}Al_xTi_{2-x}(PO_4)_3$) ($0.1 \leq x \leq 0.4$) having a NASICON skeleton, amorphous LIPON($Li_{2.9}PO_{3.3}N_{0.46}$), and $Li_7La_3Zr_2O_{12}$(LLZ) of garnet type.

Among these oxides, the solid electrolyte preferably contains an inorganic compound having a garnet structure. An inorganic compound having a garnet structure is preferable because Li ion conductivity and reduction resistance are high and the electrochemical window is wide. As inorganic compounds having a garnet structure, for example, $Li_{5+x}A_yLa_{3-y}M_2O_{12}$ (A is at least one element selected from a group of Ca, Sr, and Ba and M is at least one element selected from Nb and Ta), $Li_3M_{2-x}Zr_2O_{12}$ (M is at least one element selected from Ta and Nb), $Li_{7-3x}Al_xLa_3Zr_3O_{12}$, and $Li_7La_3Zr_2O_{12}$(LLZ) can be cited. In the above formulas, x is, for example, 0 to 0.8 and preferably 0 to 0.5. y is, for example, 0 to 2. An inorganic compound having a garnet structure may contain one of these compounds or two compound or more as a mixture. Among these compounds, since $Li_{6.25}Al_{0.25}La_3Zr_3O_{12}$ and $Li_7La_3Zr_2O_{12}$ have high ionic conductivity and are electrochemically stable, these are excellent in discharge performance and cycle life performance.

(5) Container Member

As the container that receives the positive electrode, negative electrode, and electrolyte, a metal container, a laminate film container or a resin container which is made of polyethylene or polypropylene may be used.

As the metal container, a metal can which is made of nickel, iron or stainless steel and has a rectangular or cylindrical shape may be used.

The plate thickness of each of the resin container and the metal container is preferably from 0.05 mm to 1 mm. The plate thickness is more preferably 0.5 mm or less and still more preferably 0.3 mm or less.

Examples of the laminate film include a multilayer film formed by covering a metal layer with a resin layer. Examples of the metal layer include a stainless steel foil, an aluminum foil, and an aluminum alloy foil. As the resin layer, a polymer such as polypropylene (PP), polyethylene (PE), nylon or polyethylene terephthalate (PET) may be used. The thickness of the laminate film is preferably from 0.01 mm to 0.5 mm and more preferably 0.2 mm or less.

The secondary battery according to the embodiment may have various shapes such as a rectangular shape, a cylindrical shape, a flat shape, a thin shape, and a coin shapes.

(6) Negative Electrode Terminal

The negative electrode terminal can be formed from a material that is electrochemically stable at the potentials of alkali metal ions insertion/extraction of the negative active material and has a conductive property. Specifically, the material for the negative electrode terminal may contain zinc, copper, nickel, stainless steel or aluminum, or an aluminum alloy containing at least one element selected from Mg, Ti, Zn, Mn, Fe, Cu, and Si. As the material for the negative electrode terminal, zinc or a zinc alloy is preferably used. In order to reduce the contact resistance between the negative electrode terminal and the negative electrode current collector, the negative electrode terminal is preferably made of the same material as that of the negative electrode current collector.

(7) Positive Electrode Terminal

The positive electrode terminal is made of a material that is electrically stable in a potential range of 3 V to 4.5 V with respect to oxidation-reduction potential of alkali metal (vs. Li/Li$^+$) and has a conductive property. Examples of the material for the positive electrode terminal include titanium, aluminum, or an aluminum alloy containing at least one element selected from Mg, Ti, Zn, Mn, Fe, Cu, and Si. In order to reduce the contact resistance between the positive electrode terminal and the positive electrode current collector, the positive electrode terminal is preferably made of the same material as that of the positive electrode current collector.

Next, the secondary battery according to the embodiment will be described in detail with reference to the drawings.

Figure 2:
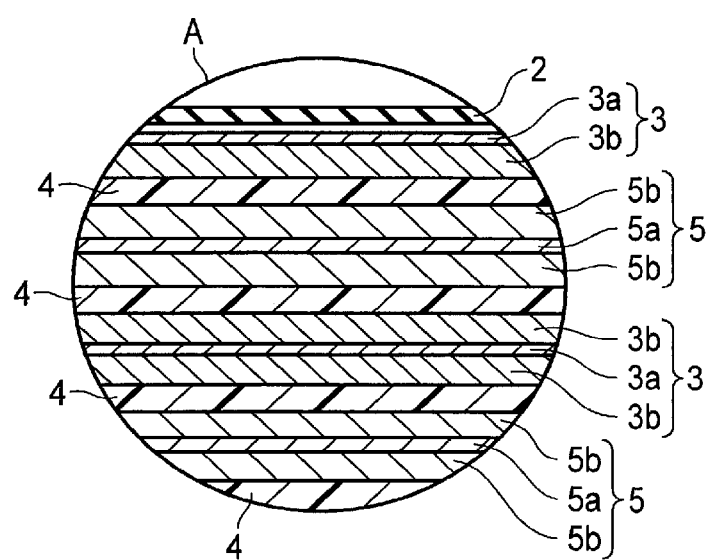
FIG. 2 is an enlarged cross-sectional view showing part A of the secondary battery shown in FIG. 1.

FIG. 1 is a sectional view schematically showing an example of a secondary battery according to an embodiment. FIG. 2 is an enlarged sectional view of a portion A of the secondary battery shown in FIG. 1.

The secondary battery 100 shown in FIG. 1 and FIG. 2 includes a bag-shaped container member 2 shown in FIG. 1, an electrode group 1 shown in FIG. 1 and FIG. 2, and an aqueous electrolyte (not shown). The electrode group 1 and the aqueous electrolyte are stored in the bag-shaped container member 2. The aqueous electrolyte (not shown) is held in the electrode group 1.

The bag-shaped container member 2 is formed from a laminate film including two resin layers and a metal layer disposed therebetween.

As shown in FIG. 1, the electrode group 1 is a flat wound electrode group. The electrode group 1 includes negative electrodes 3, separators 4, and positive electrodes 5 as shown in FIG. 2. The separator 4 is disposed between the negative electrode 3 and the positive electrode 5.

The negative electrode 3 includes a negative electrode current collector 3a and negative electrode active material-containing layers 3b. In the portion of the negative electrode 3 located at the outermost shell of the wound electrode group 1, the negative electrode active material-containing layer 3b is formed only on the inside surface side of the negative electrode current collector 3a, as shown in FIG. 2. In another portion of the negative electrode 3, the negative electrode active material-containing layer 3b is formed on both sides of the negative electrode current collector 3a.

The positive electrode 5 includes a positive electrode current collector 5a and positive electrode active material-containing layers 5b formed on both sides thereof.

As shown in FIG. 1, a negative electrode terminal 6 and a positive electrode terminal 7 are positioned near the outer end of the wound electrode group 1. The negative electrode terminal 6 is connected to the outermost part of the negative electrode current collector 3a. In addition, the positive electrode terminal 7 is connected to the outermost part of the positive electrode current collector 5a. The negative electrode terminal 6 and the positive electrode terminal 7 extend outward from opening portions of the bag-shaped container member 2. A thermoplastic resin layer is provided on the inner surface of the bag-shaped container member 2, and the openings are closed by thermal fusion bonding of the thermoplastic resin layer.

Figure 3:
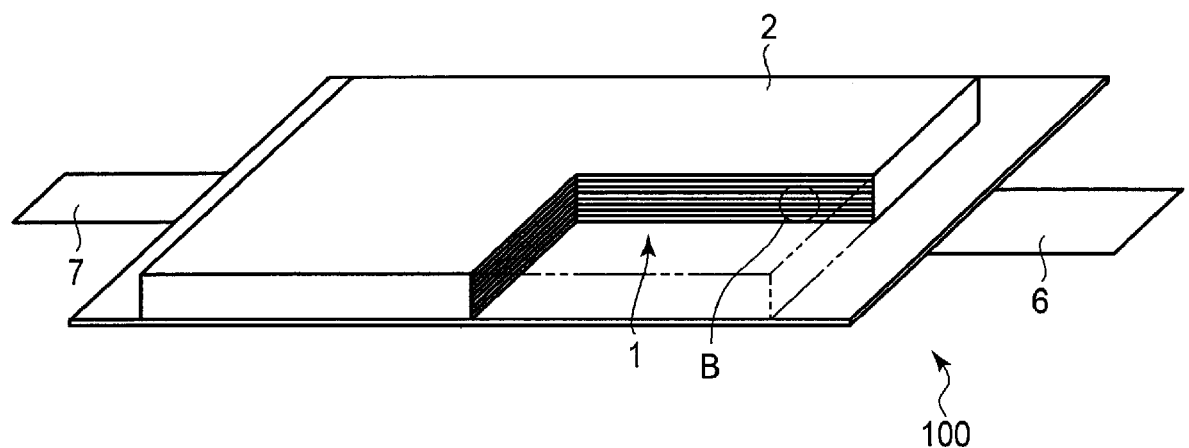
FIG. 3 is a partially cut perspective view schematically showing another example of the secondary battery according to the first embodiment.
Figure 4:
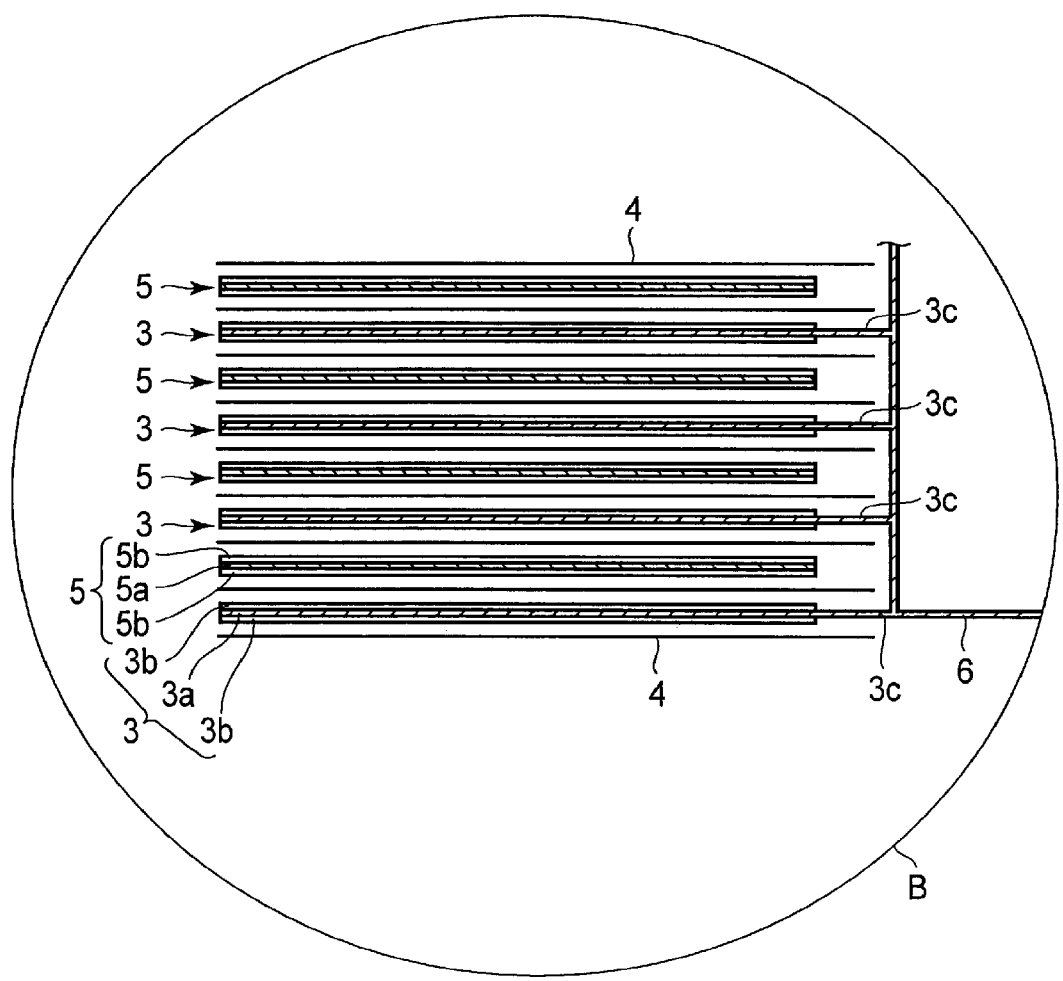
FIG. 4 is an enlarged cross-sectional view showing part B of the secondary battery shown in FIG. 3.

The secondary battery according to the embodiment is not limited to the secondary battery having the structure shown in FIGS. 1 and 2, and may be, for example, a battery having a structure shown in FIGS. 3 and 4.

FIG. 3 is a partial cut-away sectional perspective view schematically showing another example of the secondary battery according to the embodiment. FIG. 4 is an enlarged sectional view of a portion B of the secondary battery shown in FIG. 3.

The secondary battery 100 shown in FIGS. 3 and 4 includes an electrode group 1 shown in FIGS. 3 and 4, a container member 2 shown in FIG. 3, and an aqueous electrolyte (not shown). The electrode group 1 and the aqueous electrolyte are stored in the container member 2. The aqueous electrolyte is held in the electrode group 1.

The container member 2 is made of a laminate film including two resin layers and a metal layer intervening therebetween.

The electrode group 1 shown in FIG. 4 is a laminated electrode group. The laminated electrode group 1 has a structure in which a negative electrode 3 and a positive electrode 5 are alternately laminated with a separator 4 intervening therebetween.

The electrode group 1 includes plural of negative electrodes 3. Each of the negative electrodes 3 includes a negative electrode current collector 3a and a negative electrode active material-containing layer 3b carried on both surfaces of the negative electrode current collector 3a. In addition, the electrode group 1 includes plural of positive electrodes 5. Each of the positive electrodes 5 includes a positive electrode current collector 5a and a positive electrode active material-containing layer 5b carried on both surfaces of the positive electrode current collector 5a.

The negative electrode current collector 3a of each negative electrode 3 includes a portion 3c on one side where the negative electrode active material-containing layer 3b is not carried on any surfaces. This portion 3c acts as a negative electrode current collector tab. As shown in FIG. 4, the portion 3c acting as the negative electrode current collector tab does not overlap the positive electrode 5. In addition, plural of negative electrode current collector tabs (portion 3c) are electrically connected to the belt-shaped negative electrode terminal 6. A tip of the belt-shaped negative electrode terminal 6 is drawn outward from the container member 2.

In addition, although not shown, the positive electrode current collector 5a of each positive electrode 5 includes a portion on one side where the positive electrode active material-containing layer 5b is not carried on any surfaces. This portion acts as a positive electrode tab. Like the negative electrode tab (portion 3c), the positive electrode tab does not overlap the negative electrode 3. In addition, the positive electrode tab is positioned on the opposite side of the electrode group 1 with respect to the negative electrode tab (portion 3c). The positive electrode tab is electrically connected to the belt-shaped positive electrode terminal 7. A tip of the belt-shaped positive electrode terminal 7 is positioned on the opposite side to the negative electrode terminal 6 and is drawn outward from the container member 2.

The secondary battery according to the embodiment may constitute a battery module. The battery module may include plural of secondary batteries according to the embodiment.

In the battery module according to the embodiment, individual unit cells may be electrically connected in series or in parallel, or may be arranged in combination of series connection and parallel connection.

An example of the battery module according to the embodiment will be described with reference to the drawings.

Figure 5:
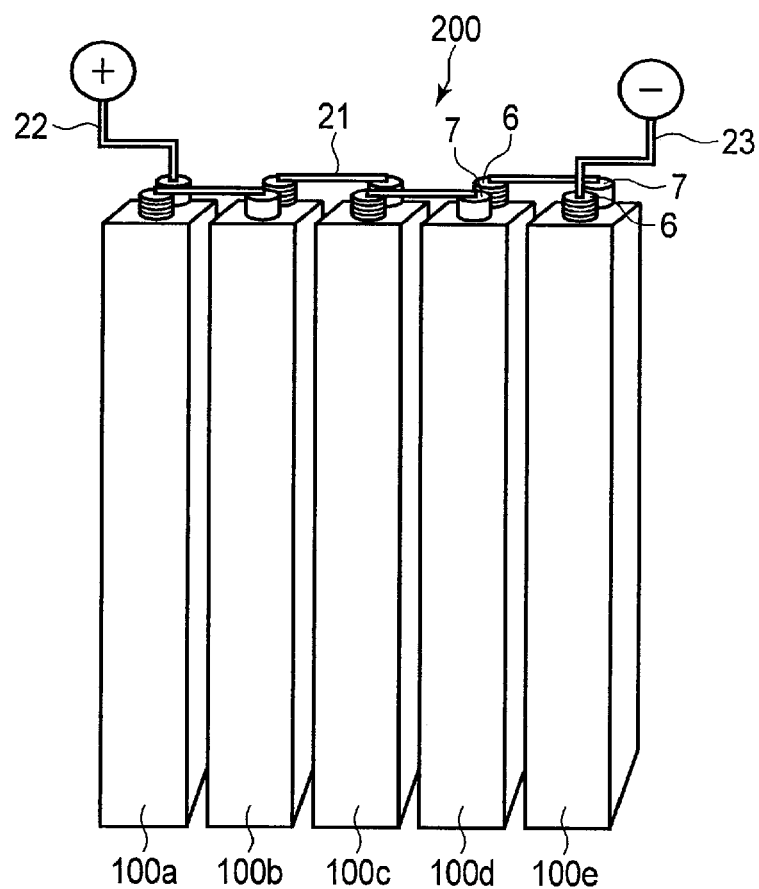
FIG. 5 is a perspective view schematically showing an example of a battery module according to the first embodiment.

FIG. 5 is a perspective view schematically showing an example of the battery module according to the embodiment. The battery module 200 shown in FIG. 5 includes five unit cells 100a to 100e, four bus bars 21, a positive electrode-side lead 22, and a negative electrode-side lead 23. Each of the five unit cells 100a to 100e is the secondary battery according to the embodiment.

The bus bar 21 connects, for example, a negative electrode terminal 6 of one unit cell 100a and a positive electrode terminal 7 of the unit cell 100b positioned adjacent to the unit cell 100a. In this way, the five unit cells 100a to 100e are connected in series by the four bus bars 21. That is, the battery module 200 shown in FIG. 5 is a battery module of five in-series connection.

As shown in FIG. 5, the positive electrode terminal 7 of the unit cell 100a located at one end on the left among the five unit cells 100a to 100e is connected to the positive electrode-side lead 22 for external connection. In addition, the negative electrode terminal 6 of the unit cell 100e located at one end on the right among the five unit cells 100a to 100e is connected to the negative electrode-side lead 23 for external connection.

A secondary battery according to the first embodiment includes a positive electrode, a negative electrode, and an aqueous electrolyte containing alkali metal ions. The aqueous electrolyte contains an organic compound containing a carboxyl group or carboxylate group and a hydroxyl group. The pH of the aqueous electrolyte is 0 or less. The ratio of the weight of the organic compound to the weight of the aqueous electrolyte is within a range of 0.01% by weight to 6.5% by weight. The number of carbon atoms in the organic compound is 5 or more. Therefore, the secondary battery according to the first embodiment is excellent in charge-and-discharge property and cycle life performance.

Second Embodiment

According to a second embodiment, a battery pack is provided. The battery pack includes the secondary battery according to the first embodiment. The battery pack includes one secondary battery according to the first embodiment, or may include a battery module with plural of secondary batteries.

The battery pack according to the embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the embodiment may further comprise an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of a motive force of vehicles such as automobiles) is provided to the battery pack via the external power distribution terminal.

Next, an example of a battery pack according to the embodiment will be described with reference to the drawings.

Figure 6:
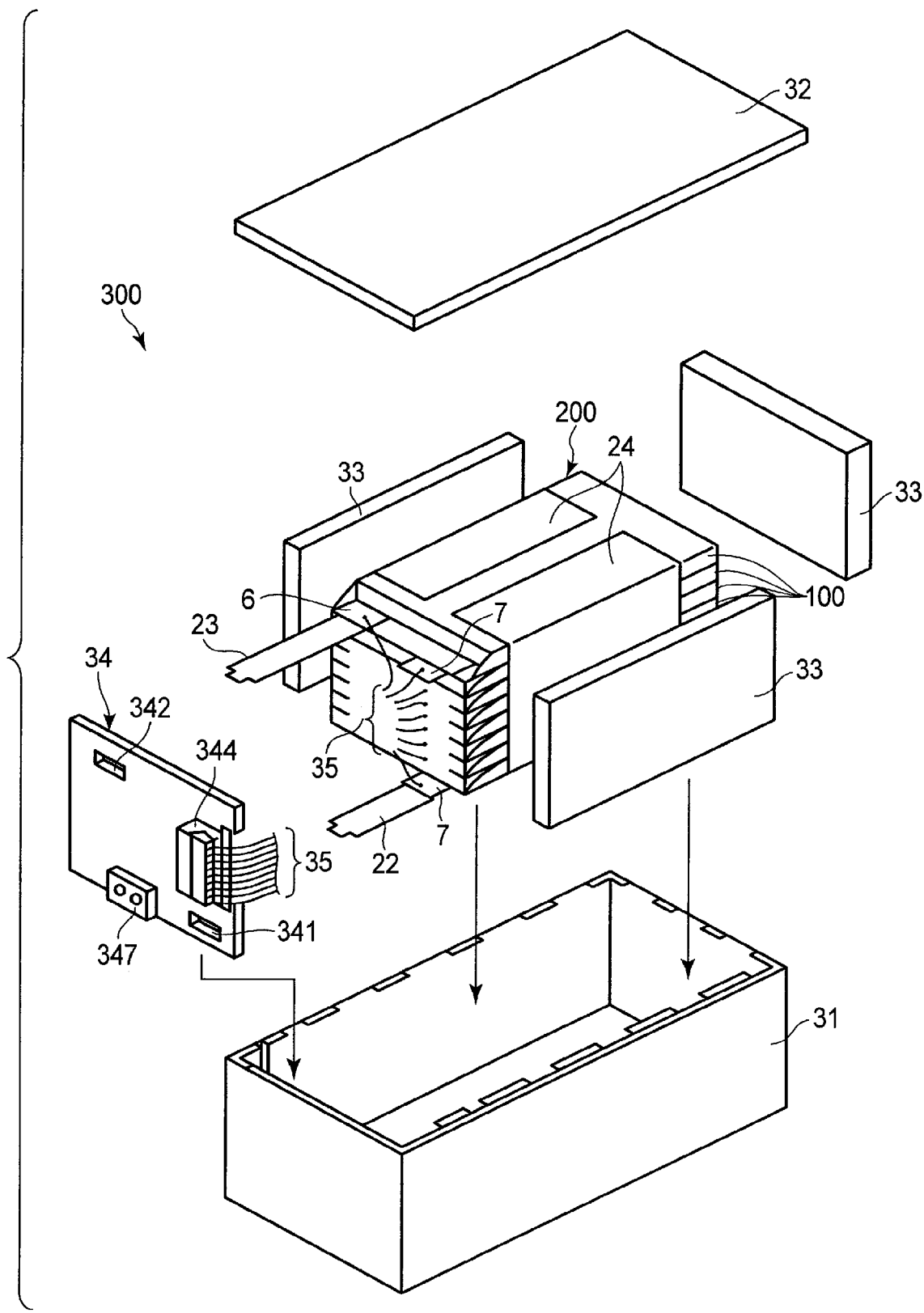
FIG. 6 is a perspective view schematically showing an example of a battery pack according to a second embodiment.
Figure 7:
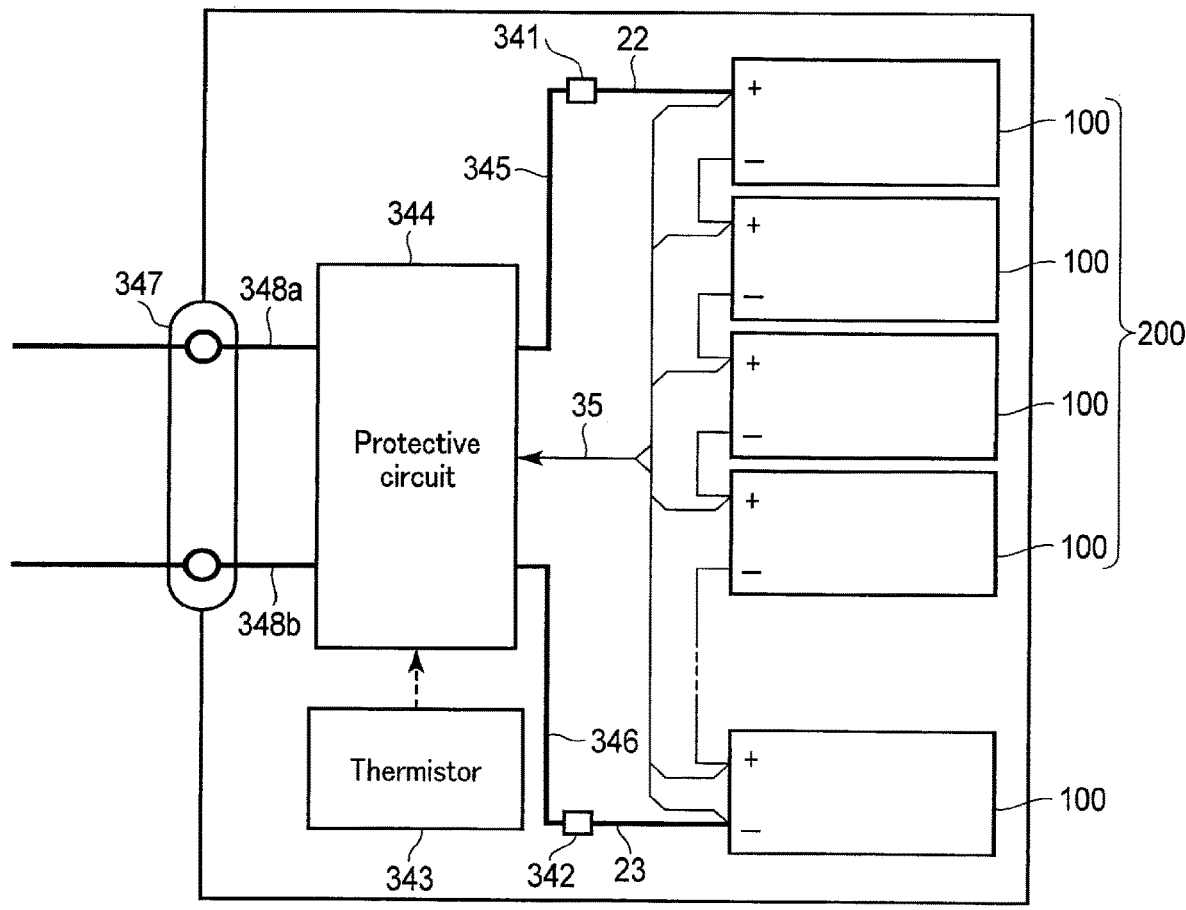
FIG. 7 is a block diagram showing an example of electric circuit of the battery pack shown in FIG. 6.

FIG. 6 is an exploded perspective view schematically showing an example of the battery pack according to the embodiment. FIG. 7 is a block diagram showing an example of an electric circuit of the battery pack shown in FIG. 6.

A battery pack 300 shown in FIGS. 6 and 7 includes a housing container 31, a lid 32, protective sheets 33, a battery module 200, a printed wiring board 34, wires 35, and an insulating plate (not shown).

A housing container 31 shown in FIG. 6 is a bottomed-square-shaped container having a rectangular bottom surface. The housing container 31 is configured to house protective sheet 33, a battery module 200, a printed wiring board 34, and wires 35. A lid 32 has a rectangular shape. The lid 32 covers the housing container 31 to house the battery module 200 and the like. Although not shown, opening(s) or connection terminal(s) for connecting to external device(s) and the like are provided on the housing container 31 and lid 32.

The battery module 200 includes plural battery cells 100, a positive electrode-side lead 22, a negative electrode-side lead 23, and an adhesive tape 24.

The battery cell 100 has, for example, a structure shown in FIGS. 1 and 2. At least one of the plural battery cells 100 is a secondary battery according to the first embodiment. The plural battery cells 100 are stacked such that the negative electrode terminals 6 and the positive electrode terminals 7, which extend outside, are directed toward the same direction. The plural battery cells 100 are electrically connected in series, as shown in FIG. 7. The plural battery cells 100 may alternatively be electrically connected in parallel, or connected in a combination of in-series connection and in-parallel connection. If the plural battery cells 100 are connected in parallel, the battery capacity increases as compared to a case in which they are connected in series.

The adhesive tape 24 fastens the plural battery cells 100. The plural battery cells 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural battery cells 100.

One end of the positive electrode-side lead 22 is connected to the positive electrode terminal 7 of the battery cell 100 located lowermost in the stack of the battery cells 100. One end of the negative electrode-side lead 23 is connected to the negative electrode terminal 6 of the battery cell 100 located uppermost in the stack of the battery cells 100.

The printed wiring board 34 is arranged on the inner surface of the housing container 31 along the short side direction. The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One principal surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through hole. By inserting the other end of the positive electrode-side lead 22 into the though hole, the positive electrode-side connector 341 and the positive electrode-side lead 22 become electrically connected. The negative electrode-side connector 342 is provided with a through hole. By inserting the other end of the negative electrode-side lead 23 into the though hole, the negative electrode-side connector 342 and the negative electrode-side lead 23 become electrically connected.

The thermistor 343 is fixed to one principal surface of the printed wiring board 34. The thermistor 343 detects the temperature of each battery cell 100 and transmits detection signals to the protective circuit 344.

The external power distribution terminal 347 is fixed to the other principal surface of the printed wiring board 34. The external power distribution terminal 347 is electrically connected to device(s) that exists outside the battery pack 300.

The protective circuit 344 is fixed to the other principal surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural battery cells 100 via the wires 35.

The protective sheets 33 are arranged on both inner surfaces of the housing container 31 along the long side direction and on one inner surface of the housing container 31 along the short side direction facing the printed wiring board 34 through the battery module 200. The protective sheet 33 is made of, for example, resin or rubber.

The protective circuit 344 controls charge and discharge of the plural battery cells 100. The protective circuit 344 is also configured to cut-off electric connection between the protective circuit 344 and the external power distribution terminal 347, based on detection signals transmitted from the thermistor 343 or detection signals transmitted from each battery cell 100 or the battery module 200.

An example of the detection signal transmitted from the thermistor 343 is a signal indicating that the temperature of the battery cell(s) 100 is detected to be a predetermined temperature or more. An example of the detection signal transmitted from each battery cell 100 or the battery module 200 is a signal indicating detection of over-charge, over-discharge, and overcurrent of the battery cell(s) 100. When detecting over-charge or the like for each of the battery cells 100, the battery voltage may be detected, or a positive electrode potential or negative electrode potential may be detected. In the latter case, a lithium electrode to be used as a reference electrode may be inserted into each battery cell 100.

Note, that as the protective circuit 344, a circuit included in a device (for example, an electronic device or an automobile) that uses the battery pack 300 as a power source may be used.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

Such a battery pack is used for, for example, an application required to have the excellent cycle performance when a large current is taken out. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the second embodiment includes the secondary battery according to the first embodiment. Therefore, the battery pack can achieve excellent charge-and-discharge property, and cycle life performance.

Third Embodiment

According to a third embodiment, a vehicle is provided. The vehicle is equipped with the battery pack according to the second embodiment.

In a vehicle according to the embodiment, the battery pack is configured, for example, to recover regenerative energy from motive force of the vehicle. The vehicle may include a mechanism configured to convert kinetic energy of the vehicle into regenerative energy.

Examples of the vehicle include two- to four-wheeled hybrid electric automobiles, two- to four-wheeled electric automobiles, electric assist bicycles, and railway cars.

In the vehicle, the installing position of the battery pack is not particularly limited. For example, the battery pack may be installed in the engine compartment of the vehicle, in rear parts of the vehicle, or under seats.

The vehicle may be equipped with plural of battery packs. In such a case, the battery packs may be electrically connected in series, in parallel, or in a combination of in series connection and in parallel connection.

An example of the vehicle according to the embodiment will be described with reference to the drawings.

Figure 8:
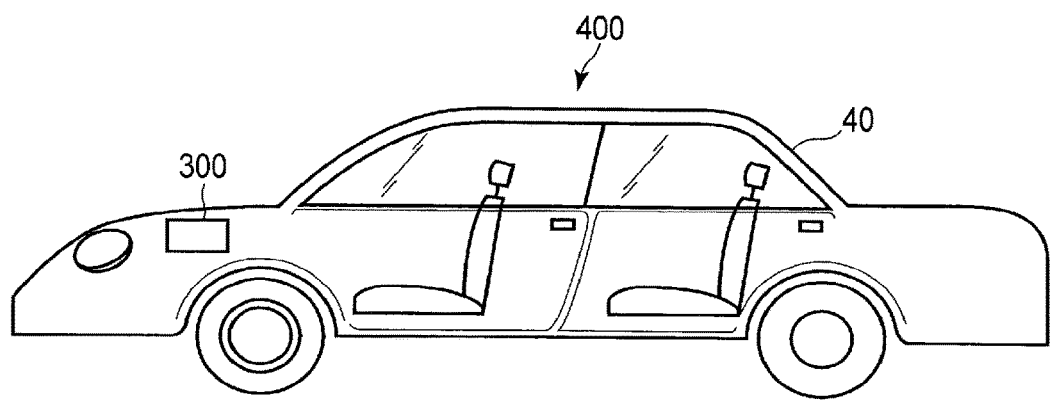
FIG. 8 is a cross-sectional view schematically showing an example of a vehicle according to a third embodiment.

FIG. 8 is a sectional view schematically showing an example of a vehicle according to the embodiment.

The vehicle 400 shown in FIG. 8 includes a vehicle body 40 and a battery pack 300 according to the second embodiment. The vehicle 400 shown in FIG. 8 is a four-wheel automobile.

This vehicle 400 may have plural battery packs 300 installed. In such a case, the battery packs 300 may be connected in series, connected in parallel, or connected in a combination of in-series connection and in-parallel connection.

In FIG. 8, the battery pack 300 is installed in an engine compartment located at the front of the vehicle body 40. As described above, the battery pack 300 may be installed in rear sections of the vehicle body 40, or under a seat. The battery pack 300 may be used as a power source of the vehicle 400. In addition, the battery pack 300 can recover regenerative energy of a motive force of the vehicle 400.

Figure 9:
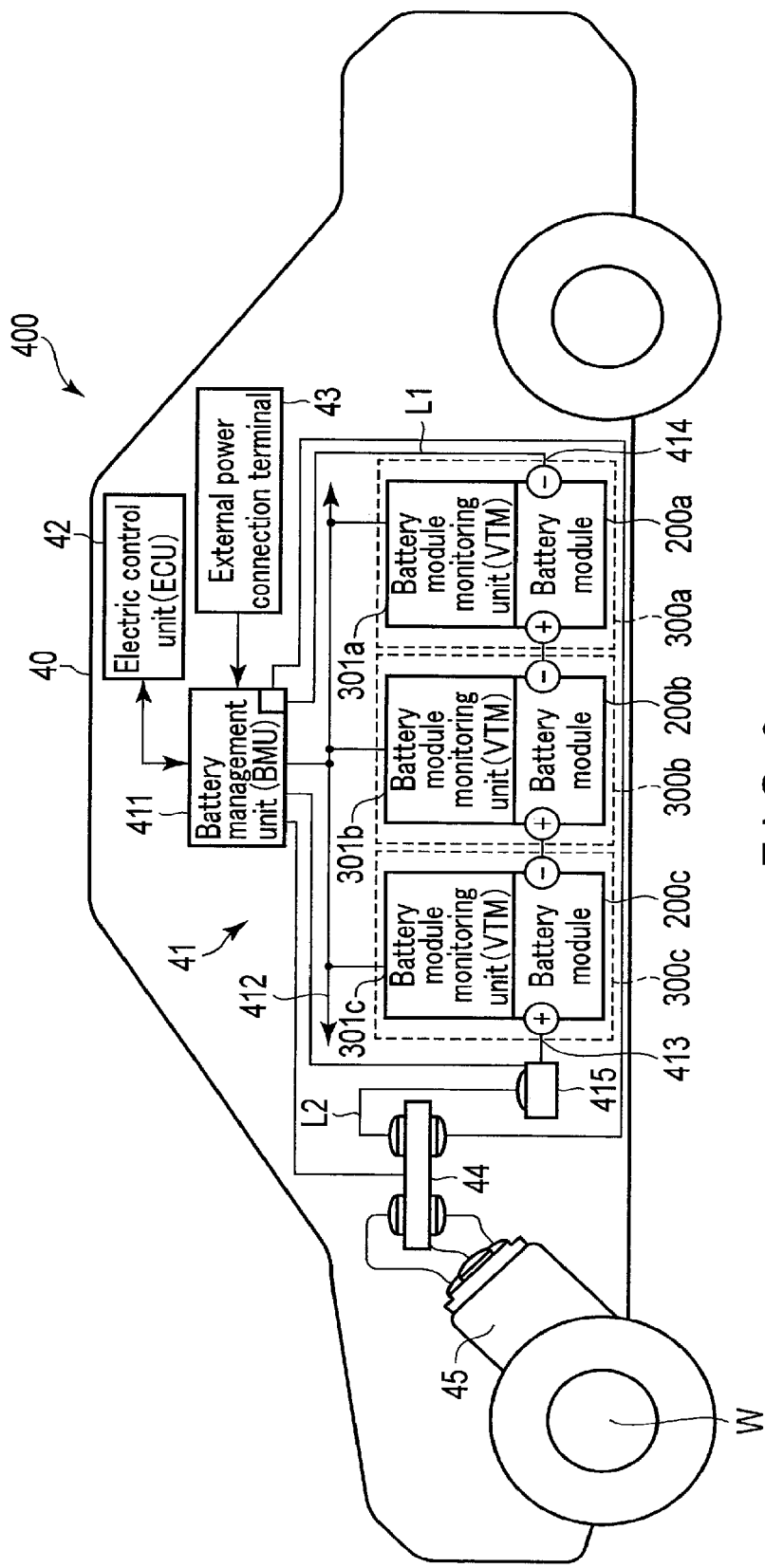
FIG. 9 is a view schematically showing another example of a vehicle according to the third embodiment.

Next, with reference to FIG. 9, an aspect of operation of the vehicle according to the embodiment is explained.

FIG. 9 is a view schematically showing an example of the vehicle according to the embodiment. A vehicle 400, shown in FIG. 9, is an electric automobile.

The vehicle 400, shown in FIG. 9, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 9, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The three battery packs 300a, 300b and 300c are electrically connected in series. The battery pack 300a includes a battery module 200a and a battery module monitoring unit 301a (for example, VTM: voltage temperature monitoring). The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural battery cells connected in series. At least one of the plural battery cells is the secondary battery according to the first embodiment. The battery modules 200a to 200c each perform charging and discharging via a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the battery cells 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each battery cell in the battery modules 200a to 200c based on commands from the battery management unit 411. It is possible, however, to measure the temperatures only at several points per battery module, and the temperatures of all of the battery cells need not be measured.

The vehicle power source 41 may also have an electromagnetic contactor (for example, a switch unit 415 shown in FIG. 9) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal provided to a coil disposed near a switch element.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 controls an output voltage based on control signals from the battery management unit 411 or the vehicle ECU 41, which controls the entire operation of the vehicle.

The drive motor 45 is rotated by electric power supplied from the inverter 44. The rotation is transferred to an axle and driving wheels W via a differential gear unit, for example.

The vehicle 400 also includes a regenerative brake mechanism, though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted, for example, into the battery pack included the vehicle power source 41.

One terminal of a connecting line L1 is connected via a current detector (not shown) in the battery management unit 411 to the negative electrode terminal 414 of the vehicle power source 41. The other terminal of the connecting line L1 is connected to a negative electrode input terminal of the inverter 44.

One terminal of a connecting line L2 is connected via the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 via communication lines.

The vehicle according to the third embodiment includes the battery pack according to the second embodiment. Therefore, according to this embodiment, it is possible to provide the vehicle equipped with the battery pack capable of achieving excellent charge-and-discharge property and cycle life performance.

EXAMPLES

Examples are explained below, but the embodiments are not limited to Examples described below.

Example 1

<Production of Positive Electrode>
A positive electrode was produced as described below.
2.0 g of $LiMn_2O_4$ (TLM-01 manufactured by L&F) as the positive electrode active material, 0.10 g of acetylene black (50% pressed product of DENKA BLACK manufactured by Denka Company Limited) as the conductive agent, and 2.5 g of PVDF fluid dispersion (#5130 manufactured by Kureha Corporation; NMP solution whose solid content ratio is 8%) as the binder (binder resin) were put into an ointment container made of plastics. The mixture was mixed for three minutes using a kneading machine to obtain a black viscous slurry. The slurry was applied to one side of Ti foil of 20 μm in thickness using an applicator whose gap thickness was 280 μm and then, a solvent was distilled on a hot plate at 120° C. to obtain a laminated body. Next, the laminated body was pressed with an initial load of 0.5 kN/cm² and a stretching rate of 0.5 mm/sec using a small roll press machine. Then, the laminated body was dried for 16 hours in a vacuum oven at 120° C. and then, stamped into a circular shape of 10 mm in diameter. The mass per unit area of the obtained positive electrode was 145 g/m² and the density Thereof was 2.4 g/Cm³.

<Production of Negative Electrode>

A negative electrode was produced as described below.

10.0 g of $Li_4Ti_5O_{12}$ (TT-M manufactured by Titan Kogyo, Ltd.) as the negative electrode active material, 1.0 g of graphite (KS-6 manufactured by Timcal) as the conductive agent, and 1.0 g of PTFE fluid dispersion (solid content: 40% by weight) as the binders (binder resins) and 8.0 g of NMP (N-methyl-2-pyrolidone) were put into an ointment container made of plastics. The mixture was mixed for three minutes using a kneading machine to obtain a gray slurry. The slurry was applied to one side of Zn foil of 50 μm in thickness using an applicator whose gap thickness was 120 μm and then, a solvent was distilled on a hot plate at 120° C. to obtain a laminated body. Next, the laminated body was pressed with an initial load of 10 kN/cm² and a stretching rate of 0.5 mm/sec using a small roll press machine. Then, the laminated body was dried for three hours in a vacuum oven at 120° C. and then, stamped into a circular shape of 10 mm in diameter. The mass per unit area of the obtained negative electrode was 71 g/m² and the density thereof was 2.1 g/cm³.

<production of Electrode Group>

A Ti plate as a conducting body and an aluminum plate whose surface was anodized were coated with tape made of plastic to prevent contact with the electrolytic solution. Next, the positive electrode and the negative electrode were opposed via filter paper (No. 5C for microfiltration), and the positive electrode and the negative electrode were crimped onto the Ti plate and the aluminum plate whose surface was anodized respectively, and these are fixed using a plastic plate and screws.

<Preparation of Electrolytic Solution>

300 mL of pure water was put into a beaker (500 mL) into which a magnetic stirrer was put. When 190.7 g (4.5 mol) of lithium chloride was added here little by little while stirring the pure water, lithium chloride was dissolved completely accompanied by mild heating. The solution was moved into a measuring flask (500 mL) and pure water was added up to the gauge line to obtain a lithium chloride solution of 9 mol/L. Glucono-δ-lactone as the first compound was added to the solution so as to be 3.2% by weight to obtain an electrolytic solution.

<Constant Current Charge-and-Discharge Test>

The electrode group produced before was put into a voltammetry cell and the cell was filled with the above electrolytic solution. A reference electrode was inserted into the cell and a constant current charge-and-discharge test was performed. The test was performed at a 1C rate for both the charge and discharge. When charged, the condition where the current value reaches 0.5 C or 20 minutes elapses, whichever reached first, is adopted as the stop condition. When discharged, 20 minutes were adopted as the stop condition.

The charge/discharge efficiency was calculated from an obtained result according to Formula (1) described below:

$$\text{Charge/discharge efficiency (\%)} = 100 \times \{\text{discharge capacity (mAh/g)/charge capacity (mAh/g)}\} \quad (1)$$

The pH of the electrolytic solution after the charge-and-discharge test was measured according to the method described in the first embodiment using LAQUA twin manufactured by HORIBA. The pH was 0 or less.

The above results are summarized in Table 3 below. In Table 3, results of Example 2 and Comparative Examples 1 to 5 described below are also described.

In Table 3, the kind of the first compound added to the aqueous electrolyte is shown in the column of "First compound". In the column of "Ratio NH/NC", the ratio of the number NH of hydroxyl groups to the number NC of carboxyl groups in one molecule of the first compound is shown. In the column of "Number of carbon atoms", the number of carbon atoms in one molecule of the first compound is shown. In the column of "Molecular weight (g/mol)", the weight of the first compound per mol is shown. In the column of "Additive concentration (wt %)", the ratio of the weight of the first compound to the weight of the aqueous electrolyte is shown. In the column of "pH of Electrolytic solution", pH of the aqueous electrolytic solution after the constant current charge-and-discharge test is shown. In the column of "Charge/discharge efficiency (%)", the value of charge/discharge efficiency in the 15th cycle calculated from the constant current charge-and-discharge test is shown. In the column of "Discharge capacity (mAh/g)", the value of discharge capacity in the 15th cycle measured in the constant current charge-and-discharge test is shown.

Figure 10:
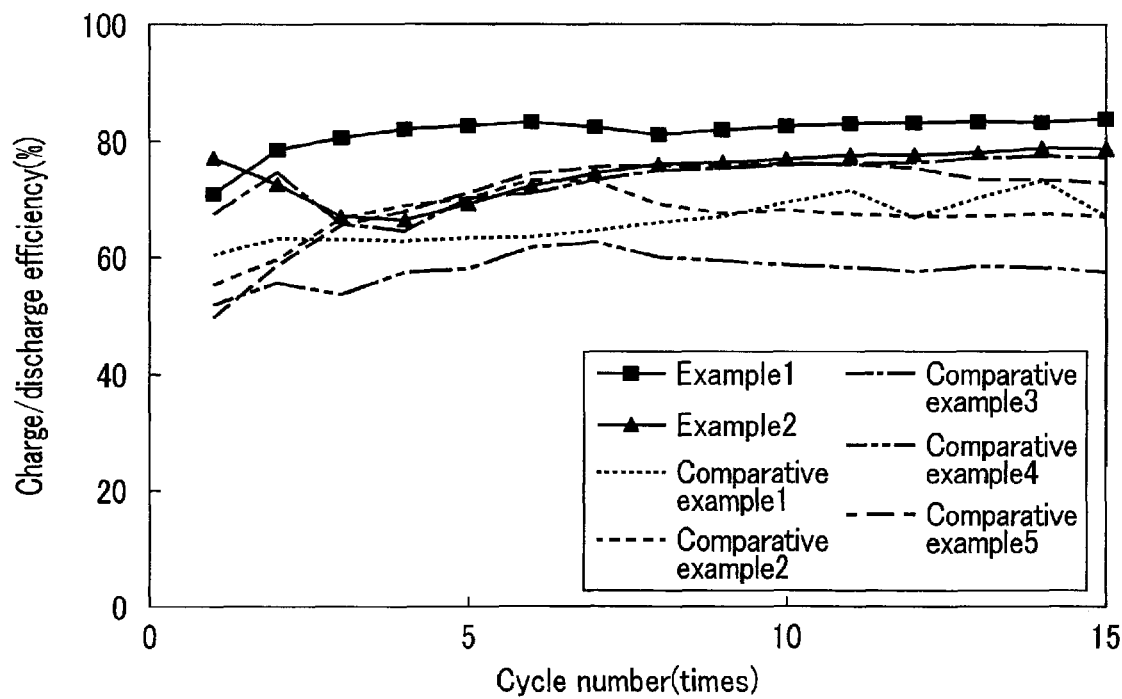
FIG. 10 is a graph showing results of charge/discharge efficiency according to Examples and Comparative Examples.

In Table 4 described below, the value of charge/discharge efficiency in each cycle from the first to 15th cycles is shown. FIG. 10 is a diagram showing Table 4 above as a graph. In the graph of FIG. 10, the charge/discharge efficiency according to Examples 1 and 2 and Comparative Examples 1 to 5 is shown by setting the cycle number to the horizontal axis and the charge/discharge efficiency to the vertical axis.

Figure 11:
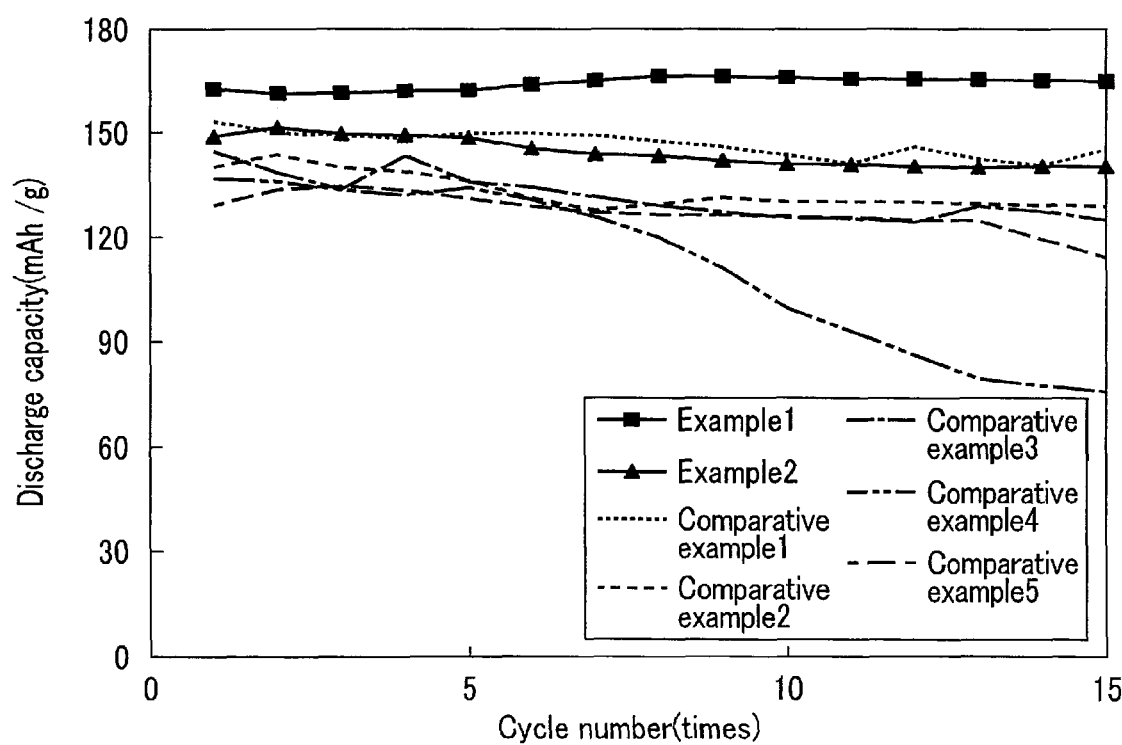
FIG. 11 is a graph showing results of discharge capacities according to Examples and Comparative Examples.

In Table 5 described below, the value of discharge capacity in each cycle from the first to 15th cycles is shown. FIG. 11 is a diagram showing Table 5 above as a graph. In the graph of FIG. 11, the discharge capacity according to Examples 1 and 2 and Comparative Examples 1 to 5 is shown by setting the cycle number to the horizontal axis and the discharge capacity to the vertical axis.

Example 2

A secondary battery was produced in the same manner as described in Example 1 except that 3% by weight of citric acid was added as the first compound and a constant current charge-and-discharge test was performed. The charge/discharge efficiency was calculated from an obtained result according to Formula 1.

Comparative Example 1

A secondary battery was produced in the same manner as described in Example 1 except that no first compound was added and a constant current charge-and-discharge test was performed. The charge/discharge efficiency was calculated from an obtained result according to Formula 1.

Comparative Example 2

A secondary battery was produced in the same manner as described in Example 1 except that 1% by weight of xylitol was added as the first compound and a constant current charge-and-discharge test was performed. The charge/discharge efficiency was calculated from an obtained result according to Formula 1.

Comparative Example 3

A secondary battery was produced in the same manner as described in Example 1 except that succinic acid was added as the first compound in a saturated concentration (about 0.5% by weight) with respect to LiCl9M or more and a constant current charge-and-discharge test was performed. The charge/discharge efficiency was calculated from an obtained result according to Formula 1.

Comparative Example 4

A secondary battery was produced in the same manner as described in Example 1 except that 2% by weight of malic acid was added as the first compound and a constant current charge-and-discharge test was performed. The charge/discharge efficiency was calculated from an obtained result according to Formula 1.

Comparative Example 5

A secondary battery was produced in the same manner as described in Example 1 except that the additive concentration of the first compound was changed to 7% by weight and a constant current charge-and-discharge test was performed. The charge/discharge efficiency was calculated from an obtained result according to Formula 1.

TABLE 3

|  | First compound | ratio NH/NC | Number of carbon atoms | Molecular weight (g/mol) | Additive concentration (wt %) | pH of Electrolytic solution | Charge/discharge efficiency (%) | Discharge capacity (mAh/g) |
| --- | --- | --- | --- | --- | --- | --- | --- | --- |
| Example 1 | Glucono-δ-lactone | 5.0 | 6 | 196 | 3.2 | 0 or less | 85 | 164 |
| Example 2 | Citric acid | 0.33 | 6 | 192.12 | 3 | 0 or less | 83 | 140 |
| Comparative Example 1 | None | — | — | — | — | 2.3 | 67 | 145 |
| Comparative Example 2 | Xylitol | 0.0 | 5 | 152.15 | 1 | 2.7 | 77 | 124 |
| Comparative Example 3 | Succinic acid | 0.0 | 4 | 118.09 | Saturated | 0 or less | 67 | 128 |
| Comparative Example 4 | Malic acid | 0.50 | 4 | 134.09 | 2 | 0 or less | 72 | 114 |
| Comparative Example 5 | Glucono-δ-lactone | 5.0 | 6 | 196 | 7 | 0 or less | 57 | 75 |

TABLE 4

| | Charge/discharge efficiency (%) | | | | | | |
| --- | --- | --- | --- | --- | --- | --- | --- |
| Cycle number | Example 1 | Example 2 | Comparative Example 1 | Comparative Example 2 | Comparative Example 3 | Comparative Example 4 | Comparative Example 5 |
| 1 | 71.0 | 77.2 | 60.4 | 55.3 | 67.5 | 51.9 | 49.6 |
| 2 | 78.5 | 72.7 | 63.2 | 59.7 | 74.7 | 55.6 | 58.6 |
| 3 | 80.6 | 67.1 | 63.1 | 66.8 | 65.8 | 53.7 | 65.6 |
| 4 | 82.1 | 66.5 | 62.8 | 69.0 | 64.6 | 57.5 | 68.0 |
| 5 | 82.7 | 69.4 | 63.4 | 70.3 | 70.3 | 58.1 | 71.2 |
| 6 | 83.3 | 72.4 | 63.6 | 73.4 | 71.2 | 61.8 | 74.6 |
| 7 | 82.4 | 74.6 | 64.7 | 73.2 | 73.5 | 62.6 | 75.7 |
| 8 | 81.1 | 76.1 | 66.1 | 69.3 | 75.0 | 60.1 | 75.9 |
| 9 | 81.9 | 76.5 | 67.1 | 67.7 | 75.5 | 59.4 | 75.9 |
| 10 | 82.6 | 77.0 | 69.5 | 68.2 | 76.1 | 58.7 | 76.3 |
| 11 | 83.0 | 77.7 | 71.6 | 67.6 | 76.2 | 58.4 | 76.1 |
| 12 | 83.1 | 77.7 | 66.9 | 67.1 | 76.4 | 57.6 | 75.5 |
| 13 | 83.3 | 78.0 | 70.3 | 67.2 | 77.2 | 58.5 | 73.6 |
| 14 | 83.2 | 78.9 | 73.3 | 67.6 | 77.6 | 58.4 | 73.5 |
| 15 | 83.8 | 78.7 | 67.3 | 67.1 | 77.2 | 57.6 | 72.9 |

TABLE 5

| | Discharge capacity (mAh/g) | | | | | | |
| --- | --- | --- | --- | --- | --- | --- | --- |
| Cycle number | Example 1 | Example 2 | Comparative Example 1 | Comparative Example 2 | Comparative Example 3 | Comparative Example 4 | Comparative Example 5 |
| 1 | 162.4 | 148.8 | 153.1 | 140.1 | 144.5 | 136.7 | 129.0 |
| 2 | 161.2 | 151.4 | 149.8 | 143.5 | 138.4 | 135.9 | 133.5 |
| 3 | 161.4 | 149.6 | 149.1 | 139.8 | 133.7 | 133.4 | 134.6 |

TABLE 5-continued

| | | | Discharge capacity (mAh/g) | | | | |
|---|---|---|---|---|---|---|---|
| Cycle number | Example 1 | Example 2 | Comparative Example 1 | Comparative Example 2 | Comparative Example 3 | Comparative Example 4 | Comparative Example 5 |
| 4 | 161.9 | 149.1 | 148.4 | 138.6 | 143.2 | 132.0 | 133.3 |
| 5 | 162.1 | 148.4 | 149.8 | 136.1 | 135.8 | 134.0 | 130.9 |
| 6 | 163.8 | 145.3 | 149.6 | 131.0 | 134.2 | 130.6 | 128.7 |
| 7 | 164.9 | 143.7 | 149.1 | 127.7 | 131.4 | 125.7 | 127.0 |
| 8 | 166.2 | 143.2 | 147.4 | 129.4 | 128.9 | 119.7 | 126.3 |
| 9 | 166.1 | 141.8 | 145.8 | 131.3 | 127.2 | 111.0 | 126.3 |
| 10 | 165.9 | 140.8 | 143.4 | 130.1 | 125.6 | 99.5 | 125.8 |
| 11 | 165.4 | 140.7 | 141.1 | 130.1 | 125.3 | 93.0 | 125.6 |
| 12 | 165.4 | 140.1 | 145.8 | 130.1 | 124.2 | 86.2 | 124.8 |
| 13 | 165.2 | 139.9 | 142.3 | 129.4 | 128.7 | 79.6 | 124.6 |
| 14 | 165.0 | 140.2 | 140.4 | 129.1 | 127.3 | 77.5 | 119.3 |
| 15 | 164.7 | 140.2 | 145.1 | 128.9 | 124.9 | 75.9 | 114.2 |

As is clear from Table 3, Examples 1 and 2 in which an aqueous electrolyte contains a first compound containing a carboxyl group or carboxylate group and a hydroxyl group, pH thereof is 0 or less, the concentration of the first compound in the aqueous electrolyte is within a range of 0.01% by weight to 6.5% by weight, and the number of carbon atoms is 5 or more are excellent in both of charge/discharge efficiency and discharge capacity.

It is clear from comparison of Examples 1 and 2 and Comparative Example 2 that when the first compound contains the hydroxyl group only (neither the carboxyl group nor the carboxylate group is contained), Comparative Example is inferior to Examples in both of charge/discharge efficiency and discharge capacity.

Also, it is clear from comparison of Examples 1 and 2 and Comparative Example 3 that when the first compound contains the carboxyl group or the carboxylate only (the hydroxyl group is not contained), Comparative Example is inferior to Examples in both of charge/discharge efficiency and discharge capacity.

It is clear from comparison of Examples 1 and 2 and Comparative Example 4 that even if the ratio NH/NC is within a range of 0.3 to 5, charge/discharge efficiency and discharge capacity are inferior if the number of carbon atoms is 4.

It is also clear from Comparative Example 5 that if the concentration of the first compound is high, Comparative Example is not excellent in charge/discharge efficiency and discharge capacity.

According to at least one embodiment and Example described above, a secondary battery is provided. The secondary battery includes a positive electrode, a negative electrode, and an aqueous electrolyte containing alkali metal ions. The aqueous electrolyte contains an organic compound containing a carboxyl group or carboxylate group and a hydroxyl group. The pH of the aqueous electrolyte is 0 or less. The ratio of the weight of the organic compound to the weight of the aqueous electrolyte is within a range of 0.01% by weight to 6.5% by weight. The number of carbon atoms in the organic compound is 5 or more. Therefore, the generation of hydrogen from a current collector can be suppressed, thereby the excellent charge-and-discharge property and cycle life performance can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising a positive electrode, a negative electrode, and an aqueous electrolyte comprising alkali metal ions,
    wherein the aqueous electrolyte comprises an organic compound comprising a carboxyl group or carboxylate group and a hydroxyl group, a pH of the aqueous electrolyte is 0 or less,
    a ratio of a weight of the organic compound to a weight of the aqueous electrolyte is within a range of 0.01% by weight to 6.5% by weight,
    a number of carbon atoms in the organic compound is 5 or more, and
    the alkali metal ions comprise lithium ions, and a molar concentration of the lithium ions in the aqueous electrolyte is 6 M or more.

2. The secondary battery according to claim 1,
    wherein the negative electrode comprises a negative electrode current collector, and the negative electrode current collector comprises zinc.

3. The secondary battery according to claim 1,
    wherein a ratio NH/NC of a number NH of the hydroxyl group comprised in one molecule of the organic compound to a number NC of the carboxyl group or carboxylate group comprised in one molecule of the organic compound is within a range of 0.3 to 5.

4. The secondary battery according to claim 1,
    wherein the number of carbon atoms in the organic compounds is 7 or less.

5. The secondary battery according to claim 1,
    wherein the alkali metal ions are lithium ions, and the molar concentration of the lithium ions in the aqueous electrolyte is 9 M or more.

6. The secondary battery according to claim 1,
    wherein the organic compound is at least one compound selected from a group consisting of glucono-δ-lactone and citric acid.

7. A battery pack comprising the secondary battery according to claim 1.

8. The battery pack according to claim 7, further comprising an external power distribution terminal and a protective circuit.

9. The battery pack according to claim 7, further comprising plural of the secondary batteries, wherein the secondary batteries are electrically connected in series, in parallel, or in combination of series connection and parallel connection.

10. A vehicle comprising the battery pack according to claim 7.

11. The vehicle according to claim 10, which comprises a mechanism configured to convert kinetic energy of the vehicle into regenerative energy.

12. The secondary battery according to claim 1,
wherein the molar concentration of the lithium ions in the aqueous electrolyte is 6 M or more and 12 M or less.

13. The secondary battery according to claim 1,
wherein the positive electrode comprises a positive electrode active material comprising at least one selected from a group consisting of a lithium manganese composite oxide having a spinel structure, a lithium nickel composite oxide, a lithium cobalt composite oxide, lithium nickel cobalt composite oxide, lithium manganese nickel composite oxide having a spinel structure, lithium manganese cobalt composite oxide, lithium iron phosphates, and lithium nickel cobalt manganese composite oxide.

14. The secondary battery according to claim 1,
wherein the negative electrode comprises a negative electrode active material comprising a titanium-containing oxide, and
the titanium-containing oxide comprises at least one selected from a group consisting of titanium oxide, lithium-titanium oxide, niobium titanium oxide and orthorhombic titanium composite oxide.

* * * * *